US012275159B2

(12) United States Patent
Ricci et al.

(10) Patent No.: US 12,275,159 B2
(45) Date of Patent: Apr. 15, 2025

(54) PERFORATING DEVICE AND CONVERTING MACHINE COMPRISING SAID DEVICE

(71) Applicant: FABIO PERINI S.P.A., Lucca (IT)

(72) Inventors: Mauro Ricci, S. Pietro a Vico (IT); Daniele Vannucci, Lucca (IT); Fabrizio Lorenzi, Lucca (IT)

(73) Assignee: Fabio Perini S.p.A., Lucca (IT)

( * ) Notice: Subject to any disclaimer, the term of this patent is extended or adjusted under 35 U.S.C. 154(b) by 781 days.

(21) Appl. No.: 17/297,573

(22) PCT Filed: Nov. 27, 2019

(86) PCT No.: PCT/IB2019/060218

§ 371 (c)(1),
(2) Date: May 27, 2021

(87) PCT Pub. No.: WO2020/110020

PCT Pub. Date: Jun. 4, 2020

(65) Prior Publication Data

US 2022/0024062 A1 Jan. 27, 2022

(30) Foreign Application Priority Data

Nov. 28, 2018 (IT) ........................ 102018000010637

(51) Int. Cl.
*B26D 1/38* (2006.01)
*B26D 7/26* (2006.01)
(Continued)

(52) U.S. Cl.
CPC ............... *B26D 1/385* (2013.01); *B26D 7/26* (2013.01); *B26F 1/20* (2013.01); *B65H 35/08* (2013.01)

(58) Field of Classification Search
CPC .......... B26D 1/205; B26D 1/385; B26D 7/26; B26D 7/2628; B26D 7/265;
(Continued)

(56) References Cited

U.S. PATENT DOCUMENTS 2,782,853 A * 2/1957 Heffelfinger ........... B26D 1/385 83/350
2,990,741 A * 7/1961 Haase .................. B23D 35/005 83/72

(Continued)

FOREIGN PATENT DOCUMENTS

EP 1052209 A1 * 11/2000 ............. B26D 1/385
EP 3243614 A1 * 11/2017 ............. B26D 1/385
WO 2018/142435 A1 8/2018

*Primary Examiner* — Evan H MacFarlane
(74) *Attorney, Agent, or Firm* — Breiner & Breiner, L.L.C.

(57) ABSTRACT

Perforating device for perforating a web material including a first blade-holder adapted to rotate around a respective first rotation axis and on which at least a first perforating blade is mounted; and a support beam, on which a plurality of counter-blades are mounted; the support beam being angularly adjustable around a selection rotation axis thereof in a plurality of angular working positions, in each angular working position one of the counter-blades being in an operative position. A movable abutment is provided adapted to co-act with the support beam. A first actuating device is provided for moving the movable abutment between an active position, where the movable abutment co-acts with the support beam, and an idle position, where the movable abutment is spaced from the support beam. A second actuating device is provided for rotating the support beam in order to arrange it selectively in one of the angular working positions.

19 Claims, 5 Drawing Sheets

(51) Int. Cl.
*B26F 1/20* (2006.01)
*B65H 35/08* (2006.01)

(58) Field of Classification Search
CPC .... B26D 2007/2692; B26D 5/02; B26D 5/04; B26D 5/06; B26D 3/085; B26D 1/38; B26D 1/40; B26D 1/405; B26F 1/20; B65H 35/08
See application file for complete search history.

(56) References Cited

U.S. PATENT DOCUMENTS

| | | | | | |
|---|---|---|---|---|---|
| 3,380,327 | A * | 4/1968 | Stemmler | B31B 50/00 | 83/100 |
| 3,750,510 | A * | 8/1973 | Gabriels | B26D 1/385 | 83/349 |
| 5,125,302 | A * | 6/1992 | Biagiotti | B26D 7/2614 | 83/342 |
| 5,284,304 | A * | 2/1994 | Biagiotti | B26D 7/08 | 242/526.1 |
| 6,431,491 | B1 * | 8/2002 | Biagiotti | B26D 11/00 | 83/695 |
| 10,913,631 | B2 * | 2/2021 | Meyerhans | B26D 5/14 | |
| 2006/0266179 | A1 * | 11/2006 | Yamashita | B26D 7/2628 | 83/130 |
| 2019/0344463 | A1 * | 11/2019 | Giurlani | B26D 5/06 | |
| 2020/0078976 | A1 * | 3/2020 | Schwamberger | B26F 1/20 | |

* cited by examiner

PERFORATING DEVICE AND CONVERTING MACHINE COMPRISING SAID DEVICE

TECHNICAL FIELD

The present invention relates to improvements to perforating devices for perforating continuous web materials along perforation lines transverse to the web material feeding direction.

In particular, devices are disclosed herein for perforating tissue paper, for example for producing toilet paper, kitchen towels and other cellulose products wound in rolls.

BACKGROUND ART

In the production of continuous web material wound in rolls, the continuous web material is often divided into single sheets through transverse perforation lines. The single sheets remain joined together until they are used, i.e. when the user separates one or more sheets by tearing along the respective perforation lines. Typically, the continuous webs of cellulose material used for producing packs of rolls or wound webs, for example toilet paper, kitchen towels and the like, are perforated in this way.

The perforation lines are made by means of rotating blades co-acting with a fixed counter-blade. The fixed counter-blade usually has a discontinuous cutting edge, and the rotating blades have respective continuous cutting edges. In this way, the cut obtained is discontinuous and, between segments of cut web material, segments of intact material are interposed, that are torn for use. The length of the cut segments and that of the uncut segments of material and/or the pitch of perforations, i.e. of cuts, may vary from a product to the other, for example according to the type of finished product and/or to the quality of the web material used. For instance, the perforation pitch of in toilet paper is different than that in kitchen towels.

Perforating devices have been thus designed, which allow to mount more counter-blades, for selectively working with one or the other of a plurality of counter-blades having toothed, i.e. discontinuous, cutting edges, different from one another. For example, U.S. Pat. No. 6,431,491 discloses a system having a central beam supporting two counter-blades that co-act selectively with one or the other of two distinct rotating rollers, each of which supports a plurality of blades.

The known perforating devices have some drawbacks in terms of flexibility, i.e. as regards the number of counter-blades that can be alternatively used. The prior art perforating devices have also further drawbacks as regards the complexity of switching between different operating modes, each of which is based on the selective use of one or the other of several counter-blades, with which the perforating device is provided. In the known perforating devices, the switching from one operating mode to the other is carried out manually by the operator, with complex operations for installing and removing the blades. Therefore, these operations require machine shut down and intervention of professional operators, and entail times varying also according to the operator's ability, affecting the production planning and the productivity of the production line. Moreover, manual operations may entail risks for the operators.

Therefore, it would be desirable to provide a perforating device allowing to have high flexibility and easiness in switching between the counter-blades of a plurality of perforating counter-blades.

SUMMARY

In order to overcome or alleviate one or more of the prior art drawbacks, a perforating device is provided for perforating a web material, comprising a first blade-holder adapted to rotate around a respective first rotation axis and on which at least a first perforating blade is mounted; and further comprising a support beam, on which a plurality of counter-blades are mounted, for example two or more counter-blades. The support beam is angularly adjustable around a selection rotation axis thereof in a plurality of working positions, i.e. at least two working positions. In each angular working position one of the counter-blades mounted on the support beam is selectively brought in an operative position. As used herein, the term "operative position" refers to a position where the counter-blades co-acts with the rotating blade(s) of the blade-holder or of one of the blade-holders, with which the perforating device is provided. According to what described herein, the perforating device also has a movable abutment adapted to co-act with the support beam of the counter-blades, and a first actuating device adapted to move the movable abutment between an active position, where the movable abutment co-acts with the support beam, and an idle position, where the movable abutment is spaced from the support beam. In the active position the movable abutment, co-acting with the support beam, defines a preset angular position of the support beam, to which an active position or working position of a counter-blade corresponds. In the idle position, the support beam is free to rotate around the axis thereof, without touching the movable abutment, to allow the support beam to be positioned in the desired angular position. Once the desired angular position has been achieved, the movable abutment can be brought to the active position and define the working position of the support beam. The rotation movement of the support beam is controlled by a second actuating device adapted to rotate the support beam in order to arrange it selectively in one of said angular working positions.

The perforating device so configured is adapted to be equipped with a plurality of selectable counter-blades, for example two and preferably more than two counter-blades, and to be configured to bring in working position any one of the various counter-blades in a servo-assisted manner.

The actuating devices may interface a control unit, so that the operator can set the configuration of the perforating device, for example through a user interface, a control panel, a tablet or other mobile device.

In practical embodiments, the movable abutment may be provided with a movement towards, and away from, the selection rotation axis of the support beam. Alternatively, the movable abutment may move parallel to the selection rotation axis of the support beam. Combined movements may be also provided, with a component parallel to the selection rotation axis and a component orthogonal to the selection rotation axis.

Practically, the support beam may comprise a body elongated according to the selection rotation axis and the counter-blades may extend parallel to the selection rotation axis or helically around the selection rotation axis. The elongated body of the beam may be supported, at the ends thereof, on side walls of a bearing structure, for example thorough end shanks.

The blades and/or the counter-blades may be provided with a translation movement parallel to the rotation axis of the rotating blade-holder and/or of the support beam of the counter-blades, to avoid wear concentrated in the continuous cutting edges of the blades due to the toothed, i.e. discontinuous, shape of the cutting edge of the counter-blades.

In some embodiments, the support beam is integral with a plurality of abutment surfaces adapted to co-act selectively with the movable abutment. The abutment surfaces may be provided in a flange integral with the support beam. For example, the abutment surfaces may extend approximately radially from a perimeter edge of the flange towards the center of the flange, i.e. towards the selection rotation axis.

In some embodiments, the second actuating device may be constituted only by an electronically controlled electric motor adapted to rotate the support beam selectively in order to arrange it in a plurality of alternative angular positions.

In other embodiments, the second actuating device may comprise more actuators. For instance, the second actuating device may comprise a first actuator adapted to rotate the support beam around the selection rotation axis in order to arrange angularly the support beam in one of a plurality of alternative angular arrangements, to each of which at least one angular working position corresponds. The second actuating device may further comprise a second actuator adapted to bring the support beam to said at least one angular working position, where the movable abutment touches a respective abutment surface integral with the support beam. Essentially, the first actuator performs a preliminary angular positioning, and the second actuator moves the support beam towards the movable abutment, so that the support beam takes the right angular working position with respect to the rotating roller, on which the blade(s) co-acting with the selected counter-blade is(are) mounted.

In some embodiments, the first actuator is an electric actuator, in particular an electric gear motor, and the second actuator is a linear actuator, in particular a cylinder-piston actuator. The two actuators may be controlled in coordinated manner, so as firstly to select the angular position of the support beam and then to move the support beam towards the movable abutment.

In advantageous embodiments, the second actuating device may be configured to make a quick emergency movement, so as to bring the counter-blade in a non-working position, for example in case of overload between the counter-blade and the blade(s). This situation may occur, for example, in case of an unexpected accumulation of web material due to the accidental breakage of the same web material.

The device may comprise a reciprocating translation device, adapted to apply to the support beam a reciprocating translation movement parallel to the longitudinal extension of said support beam. The reciprocating translation movement may be obtained, for example, through an electric motor driving into rotation a cam, to which the support beam is fastened.

Even if, in principle, the perforating device may have a blade-holder, for example acting as a rotating roller, on which one or more blades are mounted, in particularly advantageous embodiments the device has two rotating blade-holders, arranged with the support beam of the counter-blades in intermediate position between the two rotating blade-holders. In this way, there is a greater number of possible configurations for the perforating device, whose support beam of the counter-blades may comprise a plurality of counter-blades adapted to co-act with the rotating blade(s) of the first blade-holder and a further plurality of counter-blades adapted to co-act with the rotating blade(s) of the second blade-holder.

According to a further aspect, a converting machine for converting a web material is disclosed herein, comprising converting members and a perforating device as described above. In the present document, “converting machine” refers to any machine converting the web material in a finished or semi-finished product. The converting machine may be, for example, a rewinder for producing tissue paper rolls. In this case, the converting members may comprise winding members adapted to wind the previously perforated web material into single rolls.

BRIEF DESCRIPTION OF THE DRAWING

The invention will be better understood by following the description below and the attached drawing, showing a non-limiting embodiment of the invention. More specifically, in the drawing.

DETAILED DESCRIPTION

Figure 1:
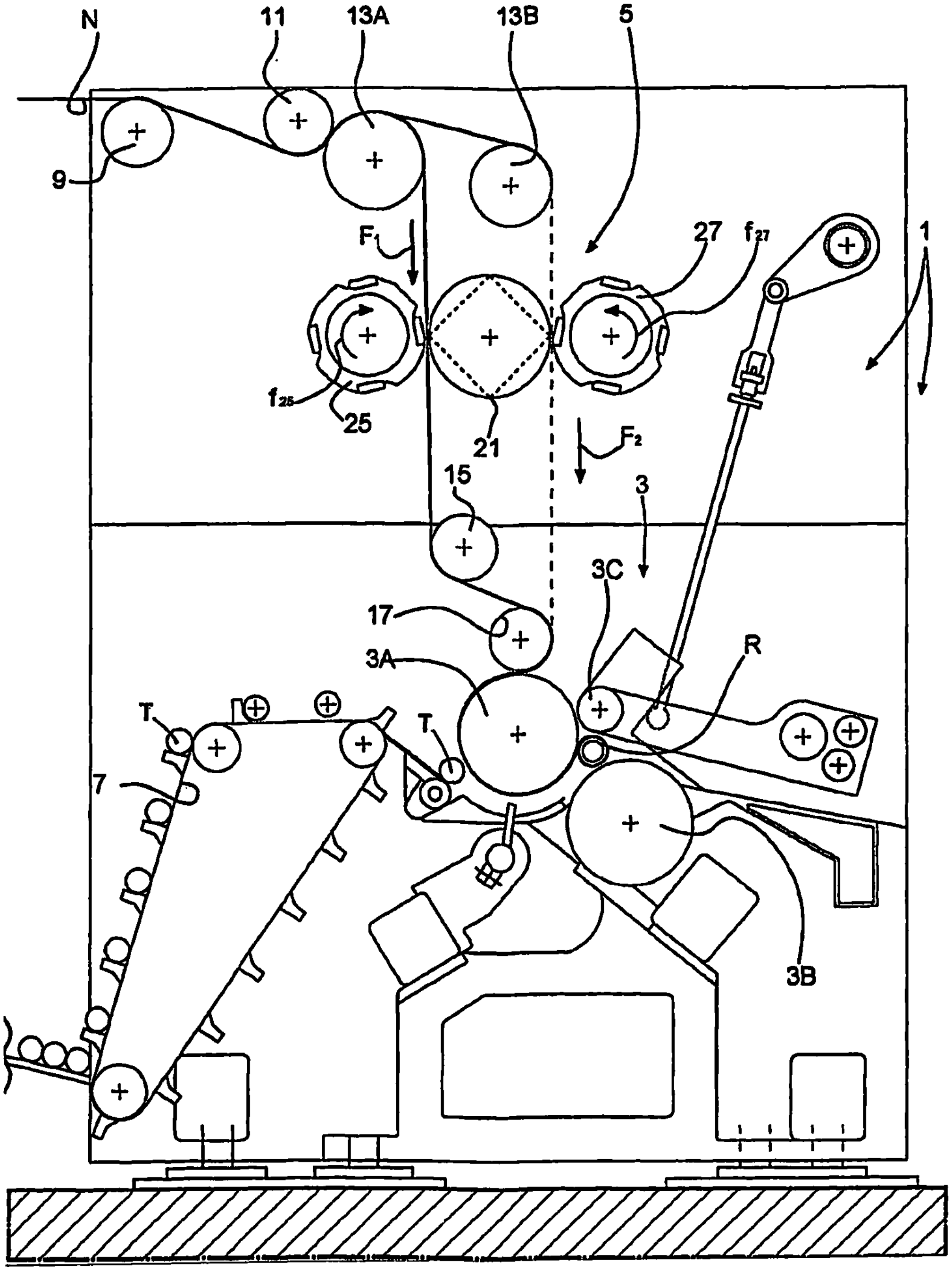
FIG. 1 is a schematic view of a rewinder with a perforating device.

Briefly, as it will be better described below with reference to the embodiment illustrated in the attached figures, the perforating device comprises a support beam, on which a plurality of perforating counter-blades are mounted, each of which can selectively co-act with one or the other of two rotating blade-holders. The support beam of the counter-blades can be positioned in any one of a plurality of selective angular positions, in each of which at least one counter-blade can be brought in working position to co-act with a rotating blade-holder. The selective positioning system, which makes the support beam angularly rotate and which places it correctly angularly in working position, may comprise two distinct actuators, as described below.

Even if, in the particularly advantageous embodiment described below and illustrated in the drawing, two rotating blade-holders are provided, adapted selectively to work with the selected counter-blade of the support beam, in other presently less advantageous embodiments only one rotating blade-holder may be provided.

Furthermore, in the illustrated embodiment each blade-holder is in the form of a rotating roller and, in the present description, it will be referred to namely as “rotating roller”. However, this configuration is not mandatory and the blade-holder may have a different form.

With initial reference to FIG. 1, number 1 generically indicates a converting machine for converting a continuous web material N, for example a single-ply or multi-ply web of tissue paper, i.e. a web comprised of a single cellulose ply or of a plurality of cellulose plies joined together.

The rewinding machine 1 comprises converting members converting the continuous web material N in rolls R. In the illustrated embodiment, the rolls are formed around tubular winding cores T fed by means of a conveyor 7 to a set of winding members 3. The rewinder, schematically illustrated in FIG. 1 and only briefly described below, is only one embodiment of a converting machine that can have any configuration. What matters is only the presence of a set of converting members adapted to convert the continuous web material N in a finished or semi-finished product, especially for example a roll R that can be then further converted, for example it can be cut into small rolls that are later packed in single or multiple packs.

In the illustrated embodiment, the set of converting members 3 comprises winding rollers, for example three winding roller 3A, 3B, 3C.

A perforating device 5 is provided upstream of the converting members 3.

In the rewinder 1 guide rollers 9, 11, 13A, 13B, 15, 17 are also provided, which define a path for the web material N through the perforating device 5 towards the set of converting members 3. In the illustrated embodiment, two alternative paths F1 and F2 are provided, along which the web material N can be fed through the perforating device towards the set of winding members 3, 3A, 3B, 3C. This double path F1, F2 is obtained by providing rollers 13A, 13B and 15, 17, which can be alternatively used to guide the web material N along the first path F1 (rollers 13A, 17) or along the second path F2 (rollers 13B, 17).

In the illustrated embodiment, the perforating device 5 comprises a support beam 21 bearing a plurality of counter-blades 23 (in this example four counter-blades, wherein the number is given just by way of non-limiting example). As it will be better described in greater detail below, the support beam 21 is selectively rotatable around a selection rotation axis 21A, to put one or the other of the counter-blades 23 in working position.

The support beam 21 is arranged in an intermediate position between two rotating blade-holders, indicated respectively with 25 and 27. The blade-holder 25 is adapted to rotate around a rotation axis 25A, and blades 29 are mounted thereon. The blade-holder 27 is adapted to rotate around a rotation axis 27A, parallel to the axis 25A. Blades 31 are mounted on the blade-holder 27. Even if in the illustrated embodiment each blade-holder 25, 27 is provided with four blades 29, 31, it should be understood that the number of blades can vary; for example, even just one blade for each blade-holder may be provided, or two or three blades, or more than four blades. The perforating device 5 may also have the two blade-holders provided with a different number of blades from each other.

In the illustrated embodiment, the counter-blades 23 extend parallel to the selection rotation axis 21A, whilst the blades 29, 31 extend helically around the rotation axes 25A and 27A respectively. The reverse configuration is also possible, wherein the counter-blades 23 helically extend around the selection rotation axis 21A and the blades 29, 31 extend parallel to the rotation axes 25A and 27A. The helical arrangement of the blades or of the counter-blades allows to perform a gradual perforation through the width of the web material N. In order that the perforation lines are orthogonal to the longitudinal extension of the web material N, coinciding with the feed direction of the web material N along the feed path, the support beam 21 and the blade-holders 25, 27 are arranged inclined, i.e. with the rotation axes thereof not horizontal.

In use, the support beam 21 is in a stationary position, whilst at least one of the two rotating blade-holders 25, 27 rotates around the respective rotation axis 25A or 27A. Between each blade-holder 25, 27 and the support beam 21 a respective perforation nip is defined, through which the web material is fed. More precisely, the web material N may be fed through the nip between the blade-holder 25 and the support beam 21, and in this case the blades 29 co-act with one of the counter-blades 23 to perforate the web material, with the blade-holder 25 rotating in the direction indicated by the arrow f25. Alternatively, the web material N may be fed through the nip between the blade-holder 27 and the support beam 21, and in this case the web material is perforated by means of the blades 31 co-acting with one of the counter-blades 23, with the blade-holder 27 rotating in the direction indicated by the arrow f27.

Figure 2:
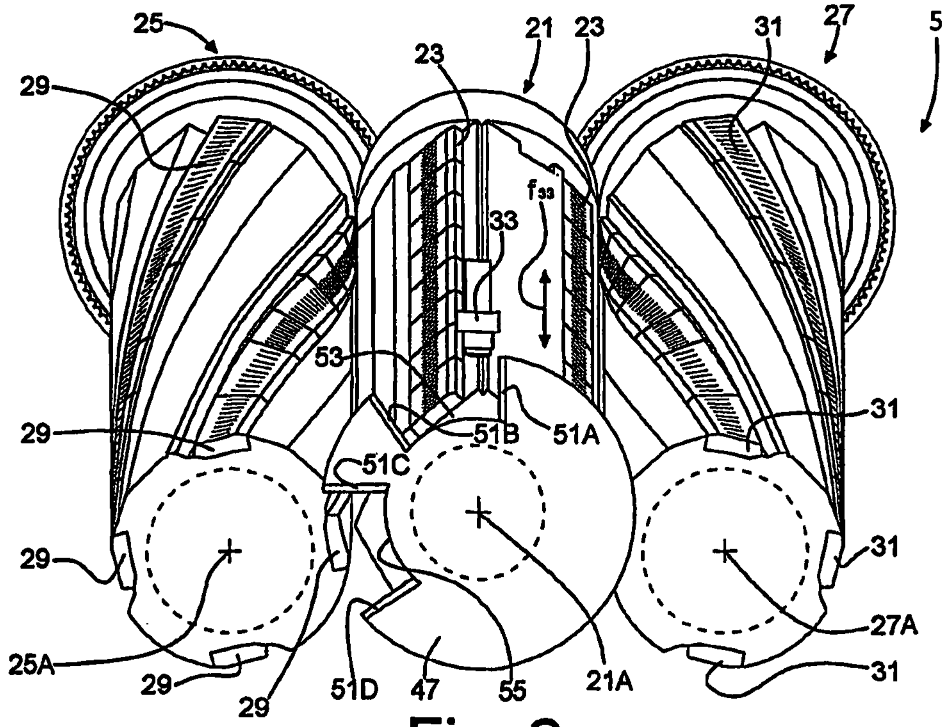
FIGS. 2, 3, 4, 5 and 6 are views of the perforating device in five different operative positions.

With particular reference to FIGS. 2 to 9, the perforating device 5 comprises an abutment 33, movable to take an idle position, indicated in FIG. 2, and an active position, illustrated for instance in FIGS. 3-6. The movement of the abutment 33 is indicated by the double arrow f33. The movement direction of the movable abutment 33 is in a plane containing the selection rotation axis 21A, around which the support beam 21 can be selectively rotate.

Figure 6:
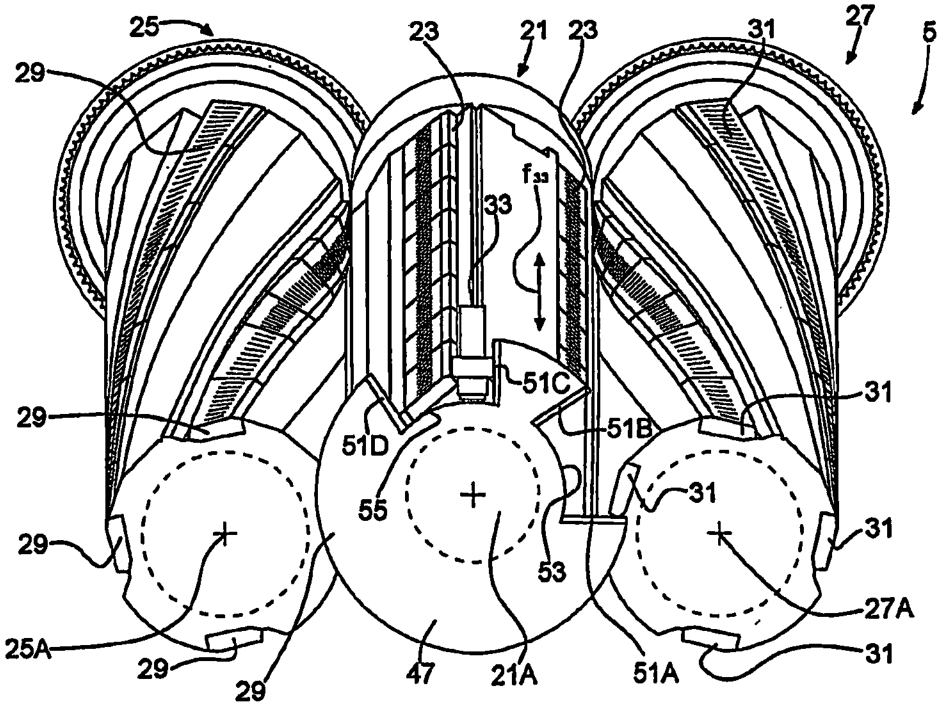
Figure 7:
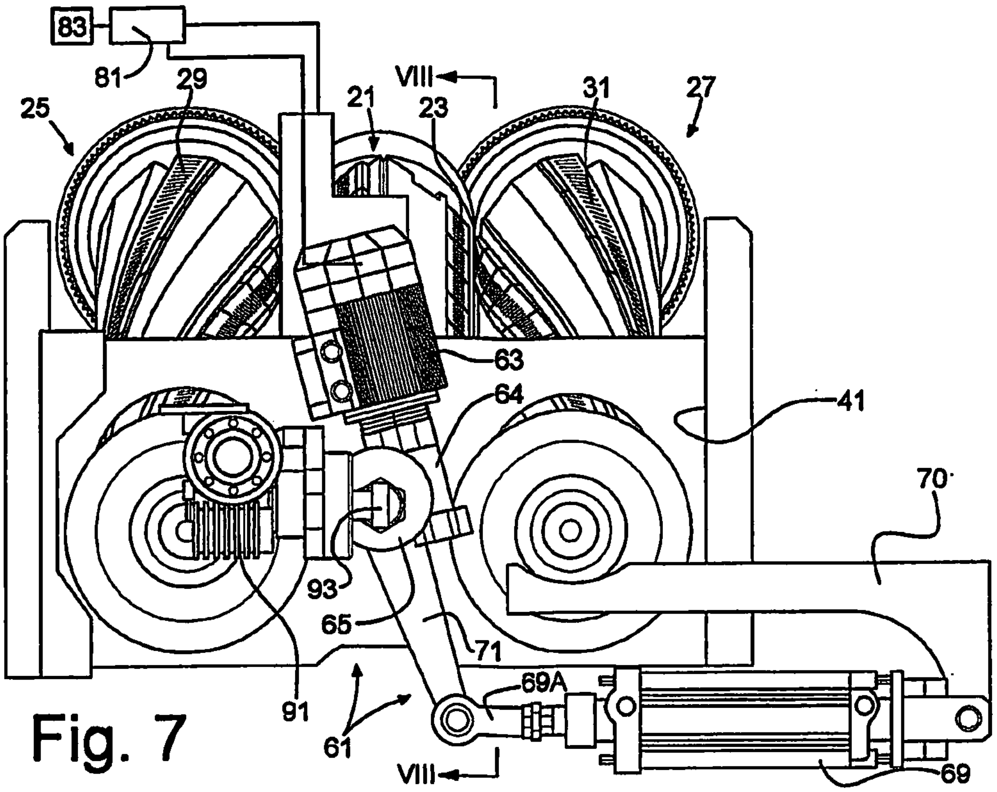
FIG. 7 is a front view according to VII-VII of FIG. 8.
Figure 8:
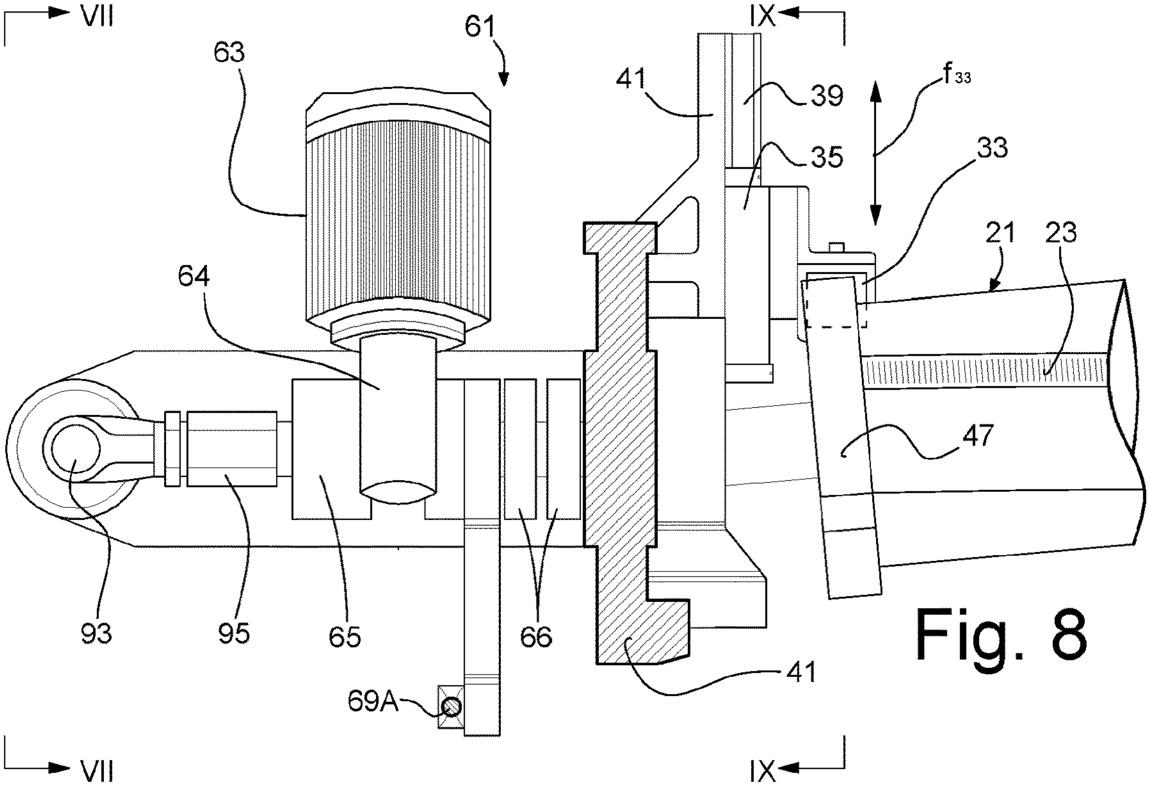
FIG. 8 is a view according to VIII-VIII of FIG. 7.
Figure 9:
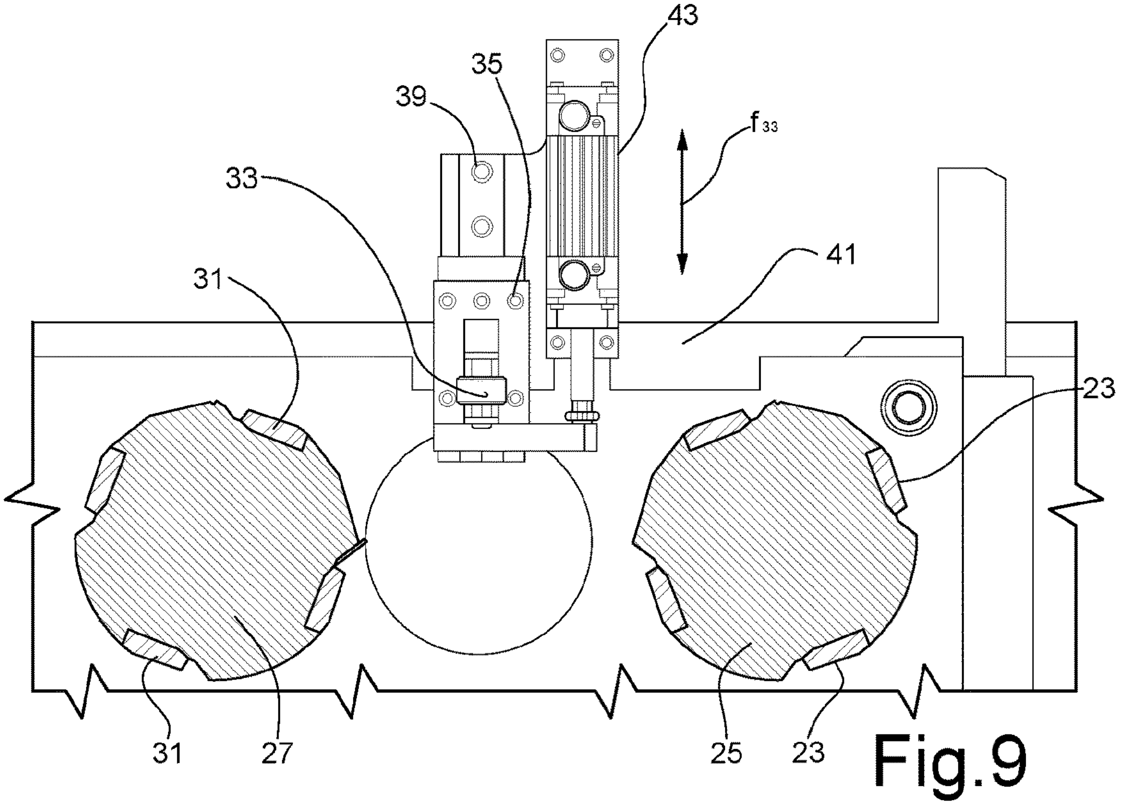
FIG. 9 is a cross-section according to IX-IX of FIG. 8.

In FIGS. 2 to 7, the movable abutment is indicated schematically, whilst FIGS. 8 and 9 show an embodiment of the movable abutment 33 and of the members controlling the movement thereof according to the double arrow f33. In the illustrated embodiment, the movable abutment 33 is formed by a wheel for reducing friction and rubbing with the contrast members, with which it co-acts, as detailed below.

The movable abutment 33 may be mounted on a slide 35, which in turn may be mounted on a guide 39 integral with a side wall 41, on which the perforating device 5 is mounted. The movement of the movable abutment 33 is controlled by a first actuating device 43, comprising for instance a cylinder-piston actuator.

Abutment surfaces, i.e. rest surfaces against the movable abutment 33, are integral with the support beam 21. The abutment surfaces are arranged around the selection rotation axis 21A in different angular positions corresponding to different angular positions of the support beam 21. In the illustrated embodiment, the abutment surfaces are formed on a flange 47 integral with the support beam 21. More in particular, in the illustrated embodiment the flange 47 forms four abutment surfaces (FIGS. 2-6), indicated with 51A, 51B, 51C, 51D.

For example, as shown in the drawing, the four abutment surfaces may be planes extending radially from a perimeter edge of the flange 47 towards the axis 21A of the support beam 21. The abutment surfaces may be formed, for example, by side walls of two notches 53, 55 provided along the edge of the flange 47.

As clearly apparent from FIGS. 2 to 6, the four abutment surfaces 51A, 51B, 51C, 51D define four angular positions of the support beam 21. Each angular position is given by the contact of one of the four abutment surfaces 51A-51D with the movable abutment 33. When the movable abutment 33 is in the notch 53, the support beam 21 can take two angular working positions, whilst it can take two further angular working positions when the movable abutment 33 is in the notch 55. To allow the support beam 21 freely to rotate, the movable abutment 33 can be brought into idle position outside the perimeter edge of the flange 47. The idle position is shown in FIG. 2. When the abutment 33 is in the idle position of FIG. 2, sufficiently spaced from the selection rotation axis 21A, the beam 21 can rotate so as to bring selectively one or the other of the notches 53 and 55 below the movable abutment 33, which then can be moved towards the selection rotation axis 21A to co-act selectively with one or the other of the abutment surfaces 51A, 51B, or with one or the other of the abutment surfaces 51C, 51D.

Figure 3:
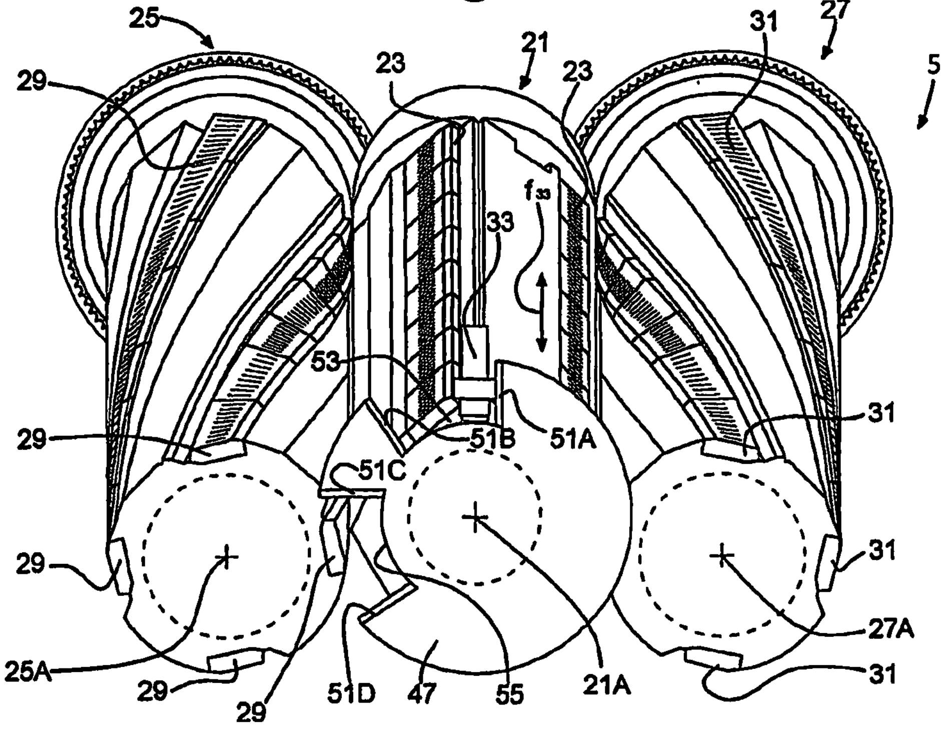

In FIG. 3, the movable abutment 33 is in the notch 53 and the angular position of the flange 47 is such as to bring the abutment surface 51A against the movable abutment 33. In this angular position, one of the counter-blades 23 of the support beam 21 co-acts with the blades 31 of the rotating blade-holder 27, while no counter-blade co-acts with the blades 29 of the rotating blade-holder 25. Therefore, in this position the web material N is fed along the path F2 (FIG. 1).

Figure 4:
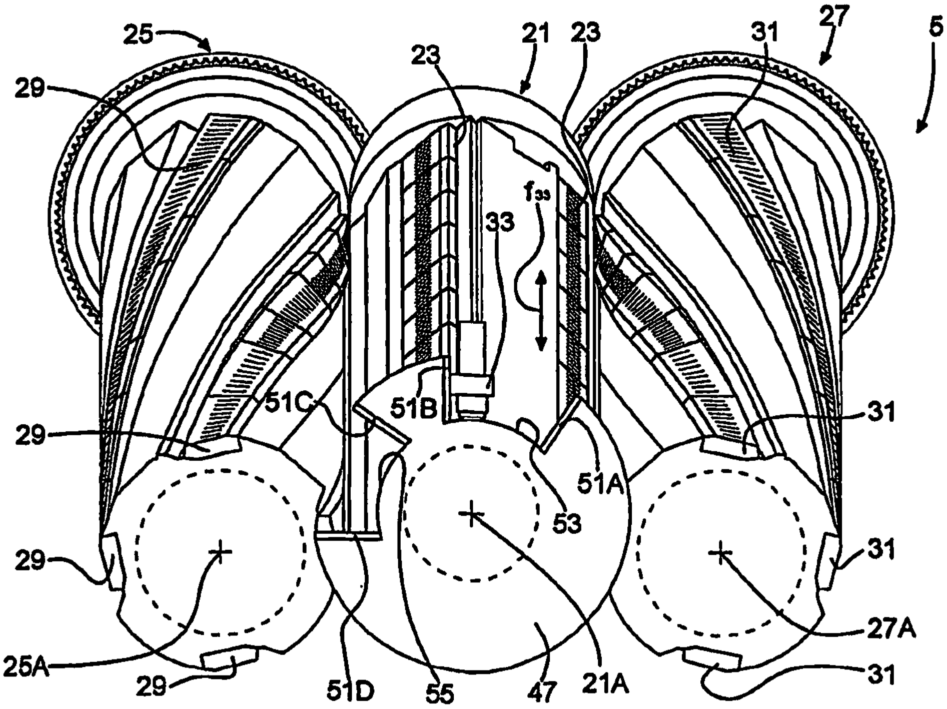

In FIG. 4 the support beam 21 has been rotated until it brings the abutment surface 51B against the movable abutment 33. In this position, one of the counter-blades 23 (different than that operative in the arrangement of FIG. 3) co-acts with the blades 29 of the rotating blade-holder 25 and the web material N passes along the path F1 in the nip between the blade-holder 25 and the support beam 21.

Figure 5:
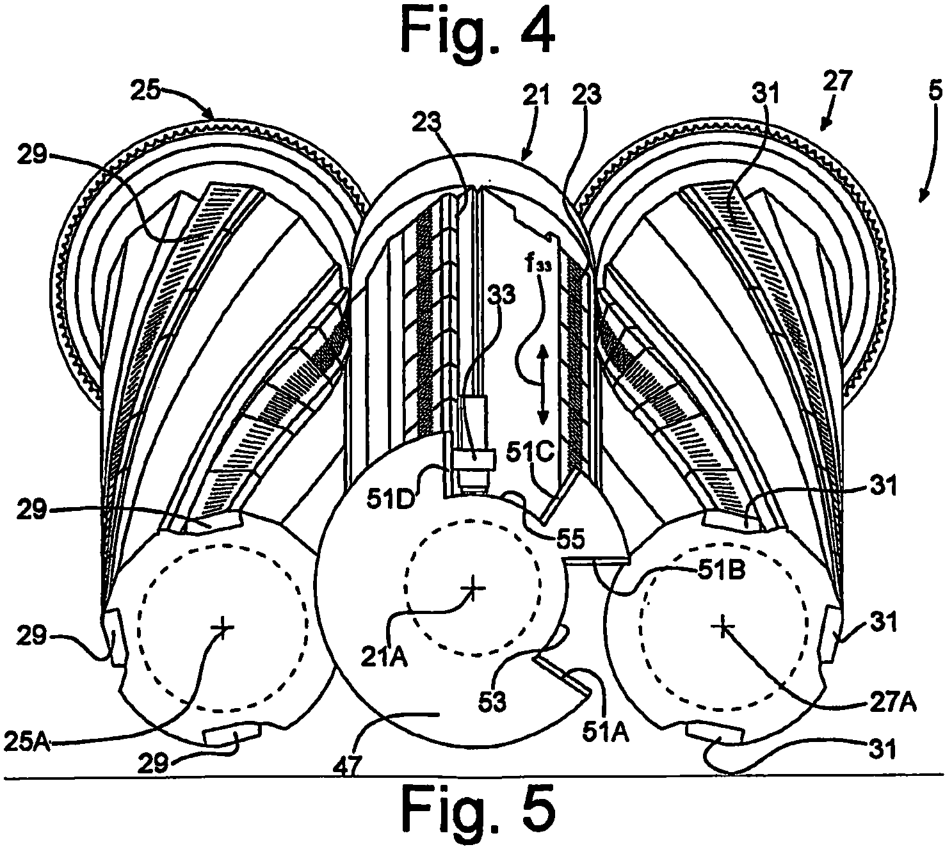

In the condition of FIG. 5, the movable abutment 33 is in the notch 55 and rests against the abutment surface 51D. In this position, a counter-blade 23 (different from the two counter-blades operative in the positions of FIGS. 3 and 4) co-acts with the blades of the rotating blade-holder 25.

Lastly, in the condition of FIG. 6, the movable abutment 33, again positioned in the notch 55, rests against the abutment surface 51C. In this position, a counter-blade 23 (different from the three counter-blades operative in the positions of FIGS. 3, 4 and 5) co-acts with the blades of the rotating blade-holder 27.

In the illustrated embodiment, the selection rotation movement of the support beam 21 is controlled by a second actuating device 61, shown in particular in FIGS. 7 and 8. In some embodiments, not shown, the second actuating device 61 may simply comprise an adequately controlled electric motor.

In the illustrated embodiment, the second actuating device 61 comprises a first actuator, for example an electric motor or, more precisely, an electric gear motor 63. The reference number 64 indicates the reduction gear of the electric gear motor 63. The electric gear motor 63 may be mounted on a shaft 65 that is torsionally coupled, for instance through a locking device 66, to the support beam 21 and coaxial therewith. The second actuating device 61 further comprises a second actuator, for example a linear actuator, in particular a hydraulically or pneumatically controlled cylinder-piston actuator 69. The linear actuator 69 is connected through a bracket 70 to the side wall 41, and through a rod 69A to an arm 71 hinged on the shaft 65. Through the described kinematic coupling, the linear actuator 69 controls rotation movements, by a limited angle, of the shaft 65 and thus of the beam 21.

The operation of the second actuating device 61 in combination with the first actuating device 43 is as follows. To set a desired angular working position for the support beam 21, firstly, if necessary, the movable abutment 33 is moved away from the flange 47. In this way, the support beam 21, and the flange 47 integral therewith, are rotated to the desired position, for example to the position of FIG. 2, actuated by the gear motor 63. More precisely, the flange 47 and the support beam 21 may be brought to such an angular position that the movable abutment 33, once brought again towards the selection rotation axis 21A, is in the notch 53, in intermediate position between the abutment surfaces 51A, 51B.

Then, keeping the gear motor 63 still, the linear actuator 69 extends or retracts, depending on whether the abutment surface 51A or the abutment surface 51B shall be activated. In this way, the shaft 69, the gear motor 63 and the support beam 21 are rotated around the selection rotation axis 21A until to achieve the desired position, for example the position of FIG. 3 or the position of FIG. 4. In this step, the gear motor 63 acts as a body rigidly integral with the shaft 65.

Assuming that the support beam 21 is in the arrangement of FIG. 3, the web material N can be fed in the nip between the support beam 21 and the rotating blade-holder 27, to be perforated by means of one of the counter-blades 23 and the blades 31. If necessary, for example in case of breakage of the web material and accumulation thereof in the feeding nip, the linear actuator 69 can quickly intervene to open the perforating device. This can be simply done by causing a clockwise rotation of the support beam 21, until the abutment surface 51A is moved away from the movable abutment 33. In this way, the paper accumulation can pass more easily through the perforation nip, making the recovery of the operative condition of the perforating device faster and safer.

For the position shown in FIGS. 4, 5 and 6 there is a similar operation. For example, in FIG. 4 the perforating device 5 is in such position as to perforate the web material N in the nip between the rotating blade-holder 25 and the support beam 21. If necessary, the actuator 69 moves back, moving the temporarily operating counter-blade 23 away from the blades 29.

The positions of FIGS. 5 and 6 are obtained by temporarily bringing the movable abutment 33 in idle position and rotating the support beam 21 through the gear motor 63, and then moving the movable abutment 33 again towards the selection rotation axis 21A, in intermediate position between the abutment surfaces 51C and 51D. The linear actuator 69, similarly to what described with reference to FIGS. 3 and 4, can bring the support beam 21 selectively to the position of FIG. 5 and to the position of FIG. 6, defined by the co-action between the movable abutment 33 in active position and the respective abutment surface 51C, 51D, so as to bring into operation one or the other of two respective counter-blades 23 with one or the other of the rotating blade-holders 25, 27.

To carry out the above described operation of angularly positioning and selecting the working counter-blade 23, the actuating devices 43 and 61 may interface a control unit 81, schematically indicated in FIG. 7, that can have one or more user interfaces 83. Through the user interface 83, the operator can set the desired type of perforation, corresponding to one or the other of the various perforating counter-blades 23. Then, the control unit 81 automatically performs the operations of selecting the angular position of the flange 47 relative to the movable abutment 33 to bring the desired counter-blade into operation.

In this way, the operation of selecting the counter-blade is simple and fast, and may not require manual operations, especially if it is not necessary to change the path (F1, F2) of the web material N.

As mentioned above, to prevent concentrated wear of the blades 29, 31, the support beam 21 may be provided with a reciprocating movement parallel to the selection rotation axis 21A and controlled for example by an electric motor 91 through an eccentric 93. The shaft 65 may be connected to the eccentric 93 through a joint 95 (see FIGS. 7 and 8). The electric motor 91 and the eccentric 93 form a reciprocating translation device.

In a further embodiment, not shown, the actuating device 61 comprises only the gear motor 63 and does not have the linear actuator 69. The gear motor 63 acts both to bring the support beam 21 into an angular working position, and to bring one of the respective abutment surfaces 51A, 51B, 51C, 51D against the movable abutment 33 with an adequate force by controlling the motor torque. In case of jamming due, for example, to the breakage of the web material N and the accumulation thereof immediately upstream of the perforation nip, it is possible to rotate the gear motor 63 so as to open the perforating device, analogously to what done through the linear actuator 69. It is possible, for example, to detect a jamming when, to keep the abutment surfaces 51A, 51B, 51C, 51D in abutment position against the movable abutment 33, the power absorption of the gear motor 63 exceeds a nominal value. This indicates the need for a greater torque to keep the abutment surfaces 51A, 51B, 51C, 51D in position, that is a symptom of accumulation of web material in the perforation nip. Alternatively, it is possible to monitor the absorption of the motors driving into rotation the rotating blade-holders 25, 27 or, more simply, to use a specific sensor, for instance a photocell or a laser sensor.

Some of the methods for detecting malfunctions can be also used in the case of the embodiment illustrated in the figures. In this case it is also possible to detect the force necessary to keep the working position through a sensor associated with the linear actuator 69.

The invention has been described with reference to various specific embodiments, but it will be clearly apparent to those skilled in the art that many modifications, changes and omissions are possible, without however departing from the protective scope of the invention and the attached claims.

The invention claimed is:

1. A perforating device for perforating a web material, comprising:

a first blade-holder adapted to rotate around a respective first rotation axis and wherein at least one first perforating blade is mounted on the first blade-holder;

a support beam, on which a plurality of counter-blades are mounted; said support beam being angularly adjustable around a selection rotation axis thereof in a plurality of angular working positions, wherein in each of said plurality of angular working positions one of the counter-blades is in an operative position;

a movable abutment adapted to co-act with the support beam, wherein the support beam is integral with a plurality of abutment surfaces adapted to co-act selectively with said movable abutment;

a first actuating device adapted to move the movable abutment between an active position, in which the movable abutment co-acts with one abutment surface of said plurality of abutment surfaces of the support beam; and an idle position, in which the movable abutment is spaced from the support beam, and the support beam is free to rotate around the selection rotation axis of the support beam, to bring another one of said plurality of abutment surfaces in a position for co-action with the movable abutment; and a second actuating device adapted to rotate the support beam in order to arrange the support beam selectively in one of said angular working positions;

wherein the first actuating device and the second actuating device are controlled in a coordinated manner by a control unit.

2. The perforating device of claim 1, wherein the movable abutment is provided with a movement towards, and away from, the selection rotation axis of the support beam.

3. The perforating device of claim 1, wherein the control unit is provided with an interface adapted to receive instructions for angularly adjusting the support beam.

4. The perforating device of claim 1, wherein the support beam comprises a body elongated along the selection rotation axis; and wherein the plurality of counter-blades extend parallel to the selection rotation axis or helically around said selection rotation axis.

5. The perforating device of claim 1, wherein the second actuating device comprises an electric motor adapted to rotate selectively the support beam around the selection rotation axis.

6. The perforating device of claim 1, wherein the second actuating device comprises: a first actuator adapted to rotate the support beam around the selection rotation axis in order to arrange angularly the support beam in one of a plurality of alternative angular arrangements, wherein at least one of said plurality of angular working positions corresponds to each one of the plurality of alternative angular arrangements; and a second actuator adapted to bring the support beam to at least one of said plurality of angular working positions, where the movable abutment contacts a respective one of the abutment surfaces integral with the support beam.

7. The perforating device of claim 6, wherein at least one of said plurality of alternative angular arrangements corresponds to either an idle position or an active position to which the support beam can be selectively brought by the second actuator.

8. The perforating device of claim 6, wherein the first actuator is an electric actuator and the second actuator is a cylinder-piston actuator.

9. The perforating device of claim 8, wherein the electric actuator is supported on a shaft torsionally constrained to the support beam and the cylinder-piston actuator is kinematically connected to the shaft by a mechanism converting linear motion of the cylinder-piston actuator into an angular motion of the shaft and of the support beam.

10. The perforating device of claim 1, further comprising a reciprocating translation device adapted to apply to the support beam a reciprocating translation movement parallel to longitudinal extension of said support beam.

11. The perforating device of claim 1, further comprising a second blade-holder, which is adapted to rotate around a respective second rotation axis and on which at least one second perforating blade is mounted.

12. The perforating device of claim 11, wherein the plurality of counter-blades comprises at least two counter-blades adapted to co-act with said at least one first perforating blade carried by the first blade-holder; and wherein the plurality of counter-blades comprises at least two counter-blades adapted to co-act with said at least one second perforating blade carried by the second blade-holder.

13. The perforating device of claim 11, wherein the plurality of abutments comprises at least a first pair of abutments rigidly connected to the support beam and associated to a first angular position of the plurality of angular working positions, and wherein the plurality of abutments comprises a second pair of abutments rigidly connected to the support beam and associated to a second angular position of the plurality of angular working positions; wherein each of said first pair of abutments and said second pair of abutments defines a working position, where a counter-blade of the support beam co-acts with the at least one first perforating blade of the first blade-holder, and a working position where a counter-blade of the support beam co-acts with the at least one second perforating blade of the second blade-holder.

14. A perforating device for perforating a web material, comprising:

a first blade-holder adapted to rotate around a respective first rotation axis and wherein at least one first perforating blade is mounted on the first blade-holder;

a support beam, on which a plurality of counter-blades are mounted; said support beam being angularly adjustable around a selection rotation axis thereof in a plurality of angular working positions, wherein in each of said plurality of angular working positions one of the counter-blades is in an operative position;

a movable abutment adapted to co-act with the support beam, wherein the support beam is integral with a plurality of abutment surfaces adapted to co-act selectively with said movable abutment;

a first actuating device adapted to move the movable abutment between an active position, in which the movable abutment co-acts with one abutment surface of said plurality of abutment surfaces of the support beam; and an idle position, in which the movable abutment is spaced from the support beam, and the support beam is free to rotate around the selection rotation axis of the support beam, to bring another one of said plurality of abutment surfaces in a position for co-action with the movable abutment; and a second actuating device adapted to rotate the support beam in order to arrange the support beam selectively in one of said angular working positions;

wherein the plurality of abutment surfaces are formed by a flange integral with the support beam.

15. The perforating device of claim 14, wherein the plurality of abutment surfaces are formed by recesses of the flange, the recesses extending radially from a perimeter edge of the flange towards a central axis of the flange.

16. The perforating device of claim 15, wherein each of said recesses defining two abutment surfaces of the plurality of abutment surfaces, the two abutment surfaces corresponding to two respective active angular positions of the plurality of angular working positions of the support beam.

17. The perforating device of claim 14, wherein the flange is arranged at an axial end of a body of the support beam, the body of the support beam extending along the selection rotation axis.

18. A converting machine comprising converting members for converting a web material; and a perforating device;

wherein the perforating device comprises a first blade-holder adapted to rotate around a respective first rotation axis and wherein at least one first perforating blade is mounted on the first blade-holder;

a support beam, on which a plurality of counter-blades are mounted; said support beam being angularly adjustable around a selection rotation axis thereof in a plurality of angular working positions, wherein in each of said plurality of angular working positions one of the counter-blades is in an operative position;

a movable abutment adapted to co-act with the support beam; wherein the support beam is integral with a plurality of abutment surfaces adapted to co-act selectively with said movable abutment;

a first actuating device adapted to move the movable abutment between an active position, in which the movable abutment co-acts with one abutment surface of said plurality of abutment surfaces of the support beam; and an idle position, in which the movable abutment is spaced from the support beam, and the support beam is free to rotate around the selection rotation axis of the support beam, to bring another one of said plurality of abutment surfaces in a position for co-action with the movable abutment; and a second actuating device adapted to rotate the support beam in order to arrange the support beam selectively in one of said angular working positions;

wherein the first actuating device and the second actuating device are controlled in a coordinated manner by a control unit.

19. The converting machine of claim 18, configured as a rewinder, wherein said converting members comprise winding members adapted to produce logs of wound web material.

* * * * *